(12) United States Patent
Yokoyama

(10) Patent No.: US 7,442,075 B2
(45) Date of Patent: Oct. 28, 2008

(54) BATTERY CONTACT MECHANISM, BATTERY RECEIVING STRUCTURE, ELECTRIC POWER UNIT, ELECTRONIC EQUIPMENT, AND PRESSURE-CONTACTING MECHANISM

(75) Inventor: Koji Yokoyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/761,649

(22) Filed: Jun. 12, 2007

(65) Prior Publication Data

US 2007/0232156 A1 Oct. 4, 2007

Related U.S. Application Data

(62) Division of application No. 11/068,983, filed on Mar. 2, 2005, now Pat. No. 7,247,048.

(30) Foreign Application Priority Data

Mar. 3, 2004 (JP) ............................. 2004-059194

(51) Int. Cl.
*H01R 3/00* (2006.01)
(52) U.S. Cl. .................................. 439/500; 439/819
(58) Field of Classification Search ................. 439/243, 439/244, 500, 729, 822, 840, 819, 698
See application file for complete search history.

(56) References Cited

U.S. PATENT DOCUMENTS

| | | | | |
|---|---|---|---|---|
| 1,588,803 A | * | 6/1926 | Owen | ............................ 429/97 |
| 2,749,530 A | * | 6/1956 | Skurow | ........................ 439/225 |
| 4,988,584 A | | 1/1991 | Shaper | ........................... 429/50 |
| 5,044,066 A | | 9/1991 | Slowski et al. | ................. 29/887 |
| 5,431,579 A | | 7/1995 | Kishi et al. | ................... 439/266 |
| 5,458,499 A | | 10/1995 | Matsuoka | ..................... 439/266 |
| 5,509,813 A | | 4/1996 | Lu | ............................... 439/79 |
| 5,649,750 A | | 7/1997 | Ishii et al. | ................. 312/223.2 |
| 5,806,960 A | * | 9/1998 | Chien | ........................... 362/84 |
| 5,882,816 A | | 3/1999 | Gotou | |
| 5,988,588 A | * | 11/1999 | Allen et al. | ............. 251/129.04 |
| 6,296,504 B1 | | 10/2001 | Ohashi | ........................ 439/266 |
| 6,371,830 B1 | * | 4/2002 | Wu et al. | ...................... 446/457 |
| 6,625,401 B2 | * | 9/2003 | Kaedeoka | .................... 396/539 |
| 6,923,690 B1 | | 8/2005 | Wang | ........................... 439/824 |
| 6,942,359 B2 | | 9/2005 | Furth et al. | .................. 362/205 |
| 7,081,318 B2 | * | 7/2006 | Lee et al. | ....................... 429/97 |
| 2005/0020126 A1 | | 1/2005 | Shinohara | |

FOREIGN PATENT DOCUMENTS

| | | |
|---|---|---|
| GB | 2 284 924 A | 6/1995 |
| JP | 2002-359026 | 12/2002 |
| JP | 2002-373634 | 12/2002 |
| JP | 2004-30968 | 1/2004 |

* cited by examiner

*Primary Examiner*—Thanh-Tam T Le
(74) *Attorney, Agent, or Firm*—Oblon, Spivak, McClelland, Maier & Neustadt, P.C.

(57) ABSTRACT

A battery contact mechanism energizing a battery in a direction of one electrode of the battery by making pressure contact between a conductive contact member and the other electrode of the battery, includes a torsion coil spring. A rotational force is given to the contact member by the torsion coil spring. The contact member is provided separately from the torsion coil spring.

9 Claims, 6 Drawing Sheets

BATTERY CONTACT MECHANISM, BATTERY RECEIVING STRUCTURE, ELECTRIC POWER UNIT, ELECTRONIC EQUIPMENT, AND PRESSURE-CONTACTING MECHANISM

CROSS-REFERENCE TO RELATED APPLICATIONS

The present patent document is a divisional of U.S. application Ser. No. 11/068,983 filed on March 2, 2005, and in turn claims priority to JP 2004-059194 filed on March 3, 2004, the entire contents of each of which are hereby incorporated herein by reference.

BACKGROUND OF THE INVENTION

1. Field of the Invention

The present invention relates to battery contact mechanisms, battery receiving structures, electric power units, electronic equipment, and pressure-contacting mechanisms, and more specifically, to a battery contact mechanism using a torsion coil spring, a battery receiving structure having the battery contact mechanism, an electric power unit having the battery receiving structure, electronic equipment having the electric power unit, and a pressure-contacting mechanism using the torsion coil spring.

2. Description of the Related Art

An apparatus such as a camera including a digital camera is often driven by a battery. Such an apparatus wherein the battery is used as the driving source generally has a structure where the battery is detachably received in a battery receiving room provided in an apparatus main body. The battery receiving room has a contact terminal and an elastic contact member. The contact terminal arranged in an electrode direction stably supports the received battery. The elastic contact member energizes the battery in the direction of the contact terminal.

Meanwhile, FIG. 1 and FIG. 2 disclose related art battery receiving structures.

In the battery receiving structure shown in FIG. 1, one end part of a coil spring (circular cone coil spring) 51 is fixed to a wall surface situated at one end side of a battery receiving room 50. A battery 52 is energized in the other side by the other end part of the coil spring 51. In addition, the end part at a side of the battery receiving room 50 of the coil spring 51 is connected to an electric lead 54 by solder 53.

Furthermore, Japan Laid-Open Patent Application Publication No. 2002-373634 discloses a battery receiving structure of electronic equipment whose objects are miniaturizing the size of the electronic equipment by making measurements of battery contact pieces contacting the electrode of the battery small and stably taking a battery power out by making a pushing force with the pressure of the battery contact pieces to the electrode of the battery constant. The battery contact pieces are formed by a torsion coil spring. An end part of the torsion coil spring works as a contact part against the electrode of the battery.

More specifically, as shown in FIG. 2, this reference discloses a battery receiving device 61-1 of electronic equipment (a camera) 61 having a battery room 65 for receiving batteries 63A and 63B. Battery contact pieces which come in contact with a positive electrode 63a and a negative electrode 63b of the batteries 63A and 63B which can be received in the battery room 65 are formed by torsion coil springs 60A and 60B. End parts of one of the torsion coil springs 60A and 60B work as electrode contact parts 60a against the electrodes 63a and 63b, respectively. The other end parts of the torsion coil springs 60A and 60B work as output terminal parts 60b for outputting electronic power of the battery. Although not shown in FIG. 2, an electric lead is connected to the output part terminal by solder and electric power is supplied from the batteries 63A and 63B to a power substrate via the electric lead. The torsion coil spring is formed by a torsion spring made of a conductive material. In FIG. 2, numerical reference 64 represents a cover of the camera and numerical reference 62 represents metal stick-shaped members. The stick-shaped members 62 are inserted into hollow parts of the coil springs 60A and 60B. Basic end parts of the stick-shaped members 62 are supported by hole forming parts formed in the cover 64 so that the stick-shaped members 62 can be rotated by an energizing force of the coil springs 60A and 60B.

However, improvements are required in the related arts shown in FIG. 1 and FIG. 2 in order to stably and precisely make contact between the electrode contact part and the battery electrode and stably supply electric power of the battery by reducing the contact resistance.

For example, in the battery receiving structure shown in FIG. 1, since the coil spring 51 works as both an energizing member and a contact member, it is difficult to simultaneously satisfy a strong energizing force and high conductivity. Because of this, an unstable state of the battery may be generated in the battery receiving room and thereby it is difficult to securely prevent an instant disconnection causing electric contact, namely a conductive state, to be broken off in an instant. In addition, as shown in FIG. 1, only the coil spring 51 works as the energizing member. Hence, if a sufficient energizing force is attempted to be generated at the coil spring, a metal material having high conductivity cannot be used as the spring material. Furthermore, in this case, the distance from a part where the battery electrode and the battery contact member are in contact to a part where an electric lead of the battery contact member is pulled out or part soldered with a print board becomes long and thereby the value of resistance becomes large. As a result of this, it is not possible to efficiently take the battery electric power out.

In the structure shown in FIG. 2, since the torsion coil works as both the energizing member and the contact member, it is difficult to simultaneously satisfy a strong energizing force and a high conductivity. In order to obtain high conductivity, for example, it is necessary to apply a nickel plating or gold plating to phosphor bronze. However, it is difficult to heighten a spring constant by using such a metal material. In a case of spring steel that is normally used, although it is possible to obtain a high spring constant, it is difficult to secure high conductivity.

In order words, under the structure shown in FIG. 2, although the above-mentioned instant disconnection problem can be solved because strong energizing forces can be obtained by the torsion coil springs 60A and 60B, it is difficult to obtain high conductivities by the springs 60A and 60B. Furthermore, under the structure shown in FIG. 2, it is necessary to arrange members combined by the torsion coil springs 60A and 60B and the stick-shaped member 62, corresponding to each of the batteries 63A and 63B. Hence, the structure is complex and it is difficult to miniaturize the entire battery receiving structure.

SUMMARY OF THE INVENTION

Accordingly, it is a general object of the present invention to provide a novel and useful battery contact mechanism, battery receiving structure, electric power unit, electronic equipment, and pressure-contacting mechanism, in which one or more of the problems described above are eliminated.

Another and more specific object of the present invention is to provide a battery contact mechanism having a simple structure whereby the above-mentioned instant disconnection problem of the electric power supply can be securely prevented and the battery electric power can be efficiently taken out, a battery receiving structure having the battery contact mechanism, an electric power unit having the battery receiving structure, and electronic equipment having the electric power unit. It is a second object of the present invention to provide a pressure-contacting mechanism having a simple structure using the torsion coil spring.

The above object of the present invention is achieved, in a first structure, by a battery contact mechanism energizing a battery in a direction of one electrode of the battery by making pressure contact between a conductive contact member and the other electrode of the battery, including:

a torsion coil spring;

wherein a rotational force (energizing force) is given to the contact member by the torsion coil spring, and the contact member is provided separately from the torsion coil spring.

In this battery contact mechanism, since the contact member to which the rotational force is given by the torsion coil spring is provided separately from the torsion coil spring, it is possible to form the contact member with a highly conductive metal material, namely a metal material having a low resistance. In addition, it is not necessary to form the torsion coil spring with the highly conductive metal material and it is possible to form the torsion coil spring with a metal material whereby a large energizing force can be generated. Furthermore, since the torsion coil spring functions as the energizing member, it is possible to stably support the battery against a slight difference of whole lengths of the batteries and unstable states of the batteries.

The above object of the present invention is achieved, in a second structure, by a battery contact mechanism energizing a battery in a direction of one electrode of the battery by making pressure contact between a conductive contact member and the other electrode of the battery, including:

a shaft body rotatably supported;

a lever made of an insulation material and provided at the shaft body so as to be rotated with the shaft; and a torsion spring winding in a spiral state and giving a rotational force (energizing force) to the shaft body as the energizing member;

wherein the contact member is provided at the lever so as to be rotated with the lever.

Since the contact member makes pressure contact with the battery electrode by giving the rotational force to the shaft body by the torsion coil spring, it is possible to achieve the same effect as the effect achieved by the first invention structure. In addition, the instant disconnection problem of the electric power supply can be securely prevented and the battery electric power can be efficiently taken out.

The above object of the present invention is achieved, in a third structure, by a battery contact mechanism of a plurality of batteries arranged in parallel, the battery contact mechanism having an energizing member energizing each battery in a direction of one electrode of the battery by making pressure contacting between conductive contact member and the other electrode of the battery, including:

a shaft body rotatably supported;

the same number of torsion springs as the number of the batteries, the torsion springs coaxially winding around the shaft body in a spiral state, the torsion springs giving a rotational force (energizing force) to the shaft body as the energizing member;

the same number of levers as the number of torsion springs, the levers made of an insulation material, the levers provided at the shaft body; and wherein one of the contact members is provided at each of the levers so as to be rotated with the lever; and each of the contact members is rotated with the lever by rotation of the shaft body based on the energizing force of the torsion coil spring so as to make pressure contact with the other electrode of the battery corresponding to the contact member.

Since the same number of torsion springs spring coaxially wind around the shaft body in a spiral state as the number of the batteries and the rotational force is given to the shaft body by the springs so that the plurality of the contact members arranged in parallel simultaneously make pressure contact with the electrodes of the plurality of the batteries arranged in parallel. Hence, under a simple structure, the instant disconnection problem of the electric power supply can be securely prevented and the battery electric power of the plurality of the batteries can be efficiently taken out. Furthermore, since the contact member is provided at the lever made of an insulation material so as to be rotated with the lever, it is possible to prevent a problem of the electrodes of the plurality of the batteries being in contact with each other.

Meanwhile, in the related art battery contact mechanism shown in FIG. 2, the same number of batteries is provided as the number of the stick-shaped members and the torsion coil springs wound against the stick-shaped members. Hence, the structure is complex. However, according to a fourth structure, the plurality of torsion coil springs wind around a single shaft body. Hence the structure is simple and it is possible to make an installing span of the shaft body long so that it is possible to rotate the shaft body more stably.

The contact member may be made of a highly conductive metal material, namely copper, silver, gold, platinum, nickel, or an alloy including at lease one metal selected from a group consisting of copper, silver, gold, platinum, and nickel.

Because of this, it is possible to take out the battery electric power efficiently.

The above object of the present invention is achieved, in a fifth structure, and shown in FIG. 3 through FIG. 6, by a battery receiving structure, including:

a battery contact mechanism having a space forming part for battery receiving and the same number of contacts 3$a$-1, 3$b$-1, as the number of a plurality of batteries 1$a$, 1$b$, . . . detachably received in the space forming part in parallel, and a battery receiving room having a battery contact piece 20 having the same number of converse contacts 6$a$, 6$b$, . . . as the number of batteries, wherein the battery contact mechanism, includes a single shaft body 4 rotatably supported in the battery receiving room, the same number of torsion coil springs 5$a$, 5$b$, . . . as the number of the batteries, the torsion coil spring 5$a$, 5$b$, . . . coaxially winding around the shaft body 4 in a spiral state, the torsion spring 5$a$, 5$b$, . . . giving a rotational force (energizing force) to the shaft body 4, the same number of levers 2$a$, 2$b$, . . . as the number of torsion springs 5$a$, 5$b$, . . . , the lever 2$a$, 2$b$, . . . made of an insulation material, the lever 2$a$, 2$b$, . . . provided at the shaft body 4; the lever 2$a$, 2$b$, . . . extending from a base end part situated in the vicinity of the shaft body 4, a plurality of projections 9$a$, 9$b$, . . . made of insulation materials and provided at the base end part of the lever, and a contact member 3a, 3b, . . . made of metal and provided at the lever, the contact member having a base end part situated in the vicinity of the shaft body and a head end part working as the contact 3a, 3b, . . . to an battery electrode, wherein, by the rotational force of the shaft body 4 given by the torsion coil spring 5a, 5b, . . . the contact 3a-1, 3b-1, . . . of the contact member 3a, 3b, . . . makes pressure contact with one of the electrodes of the battery corresponding to the contact and each of the other electrodes makes pressure contact with corresponding converse contacts 6a, 6b, . . . of the battery contact piece 20, and the battery contact mechanism further includes an electric lead inserted in a gap of a plurality of the projections 9a, 9b, . . . provided at the base end part of the lever 2a, 2b, . . . , the electric lead 8a, 8b, . . . having one end part connected by solders 10a, 10b, . . . at the base end part of the contact member and the other end part connected to a power substrate.

The above object of the present invention is achieved, in a sixth structure, by a battery receiving structure, including:

a battery contact mechanism having a space forming part for detachably receiving a plurality of batteries in a series state and a single contact; and a battery receiving room having a battery contact piece having a single converse contact;

wherein the battery contact mechanism includes a single shaft body rotatably supported in the battery receiving room;

a single torsion coil spring, the torsion coil spring coaxially winding around the shaft body in a spiral state, the torsion coil spring giving a rotational force (energizing force) to the shaft body;

a lever made of an insulation material, the lever provided at the shaft body, the lever extending from a base end part situated in the vicinity of the shaft body;

a plurality of projections made of insulation material and provided at the base end part of the lever; and a contact member made of metal and provided at the lever, the contact member having a base end part situated in the vicinity of the shaft body and a head end part working as the contact to a battery electrode;

wherein, by the rotational force of the shaft body given by the torsion coil springs, the contacts of the contact members make pressure contact with electrodes of the corresponding batteries close to the contacts and electrodes of the batteries furthest from the contacts make pressure contact with the corresponding converse contacts of the battery contact pieces; and the battery contact mechanism further includes an electric lead inserted in a gap of a plurality of the projections provided at the base end part of each of the levers, the electric lead has one end part soldered at the base end part of the contact member and the other end part connected to a power substrate.

According to the above-mentioned fifth and sixth structures, it is possible to achieve the same effect as the effect in the third structure. In addition, the electric lead for taking out electric power is rotated with the shaft body at the time of the rotation of the shaft body. According to the above-mentioned fifth and sixth structures, the electric lead is inserted in the gap of the plurality of the projections made of the insulation material and one end part of the electric lead is soldered in the vicinity of the shaft body. Hence, an excess force is not applied to the electric lead when the shaft body is rotated and the amount of displacement of the electric lead can be made minimum. Therefore, it is possible to prevent an unstable state of the battery in the battery receiving room and generation of electrical leakage current from the electric lead via the projections.

The above object of the present invention is achieved, in a seventh structure, by an electric power unit using a battery electric power having the battery receiving structure mentioned in the fifth or sixth structures, wherein the designated number of the batteries are received in the battery receiving structure so that the electric power of the batteries is supplied to the power substrate via the electric lead.

Under this structure, it is possible to provide an electric power unit having the same effect as the effect achieved by the fifth or sixth structures.

The above object of the present invention is achieved, in an eighth structure, by electronic equipment including the electric power unit as in the seventh structure.

Under this structure, it is possible to provide an electric power unit having the same effect as the effect achieved by the fifth or sixth structures.

The above object of the present invention is achieved, in a ninth structure by a pressure-contact mechanism, including:

a shaft body rotatably supported;

a torsion coil spring winding around the shaft body;

a lever provided at the shaft body; and a pressurizing member provided at the lever so as to be rotated with the shaft;

wherein the pressurizing member makes pressure contact with a member subject to being pressure contacted by a rotational force (energizing force) of the lever by the torsion coil spring.

Since the torsion coil spring winds around the shaft body and the rotational force is given to the shaft body by the torsion coil spring, it is possible to provide the pressure-contact mechanism whereby the pressurizing member can be in pressure contact with the subject to be pressure-contacted with a strong force and a simple structure.

In a tenth structure, a plurality of the torsion coil springs may be coaxially provided at the shaft body, and the same number of the levers having the pressurizing members as the number of the torsion coil springs may be provided in the vicinity of the torsion coil spring.

Under this structure, it is possible to simultaneously make pressure contact between the plurality of the pressurizing members and the plurality of the subjects to be pressure-contacted.

Other objects, features, and advantages of the present invention will become more apparent from the following detailed description when read in conjunction with the accompanying drawings.

DETAILED DESCRIPTION OF THE PREFERRED EMBODIMENTS

A description of the present invention and details of drawbacks of the related art are now given, with reference to FIG. 3 through FIG. 7, including embodiments of the present invention.

Figure 3:
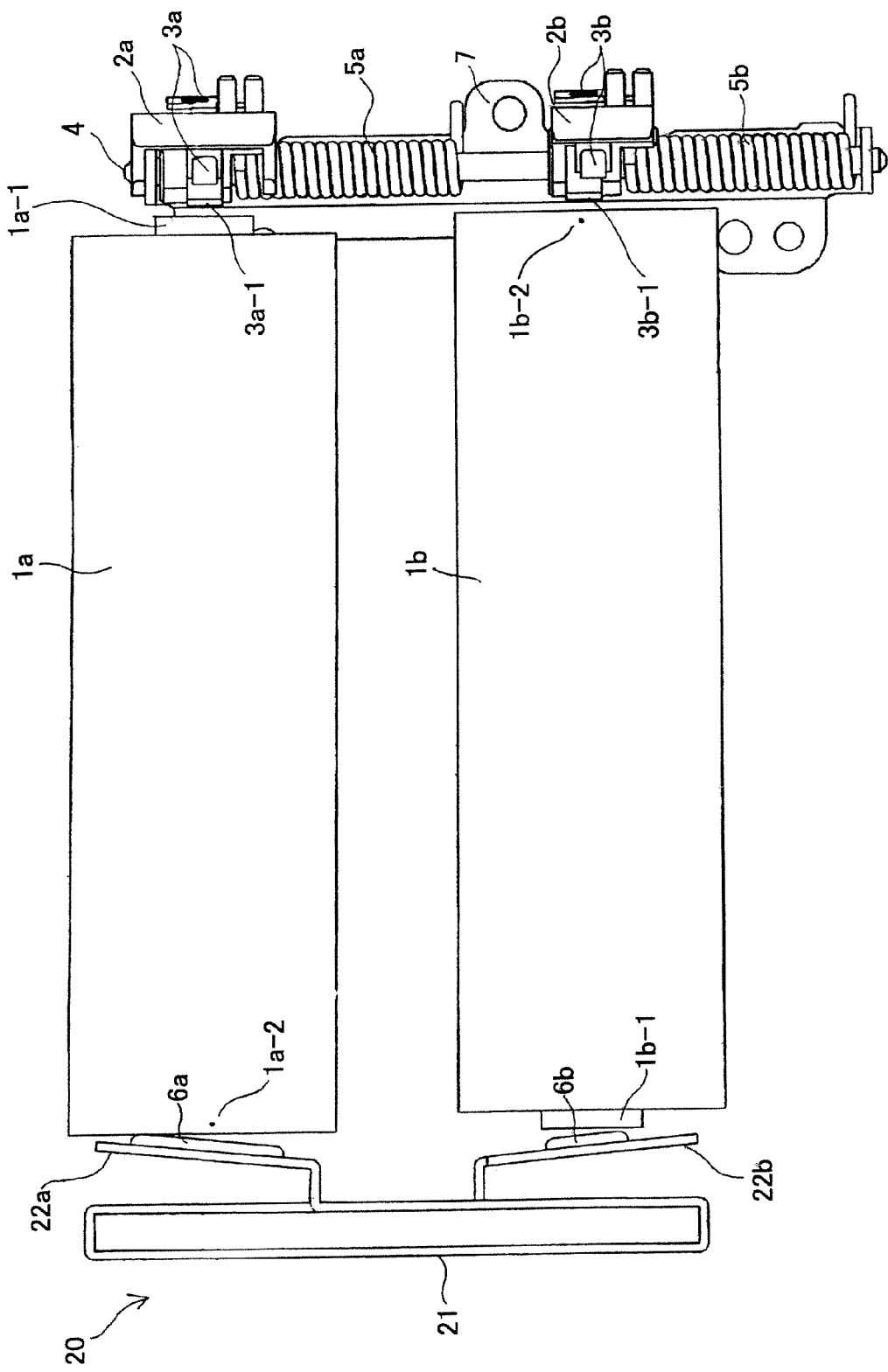
FIG. 3 is a partial plan view of a battery contact mechanism and a battery receiving structure of an embodiment of the present invention and shows a state where a battery is received in a battery receiving room.
Figure 4:
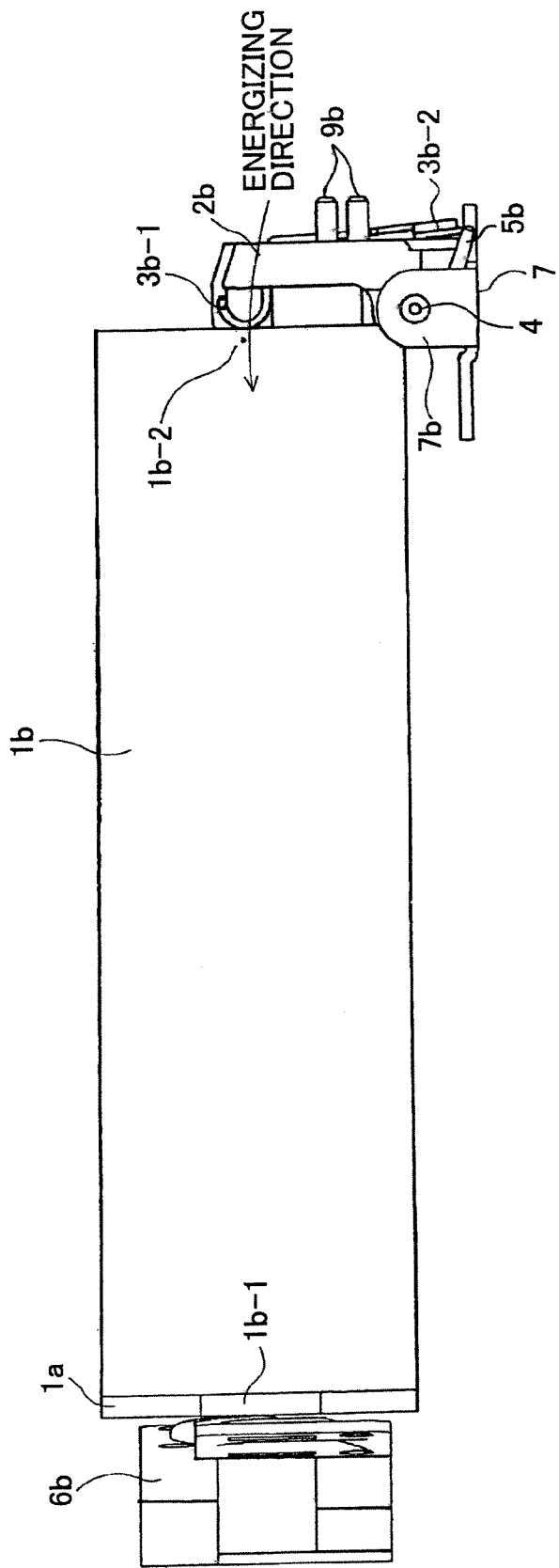
FIG. 4 is a front view of the battery contact mechanism and the battery receiving structure of the embodiment shown in FIG. 3.
Figure 5:
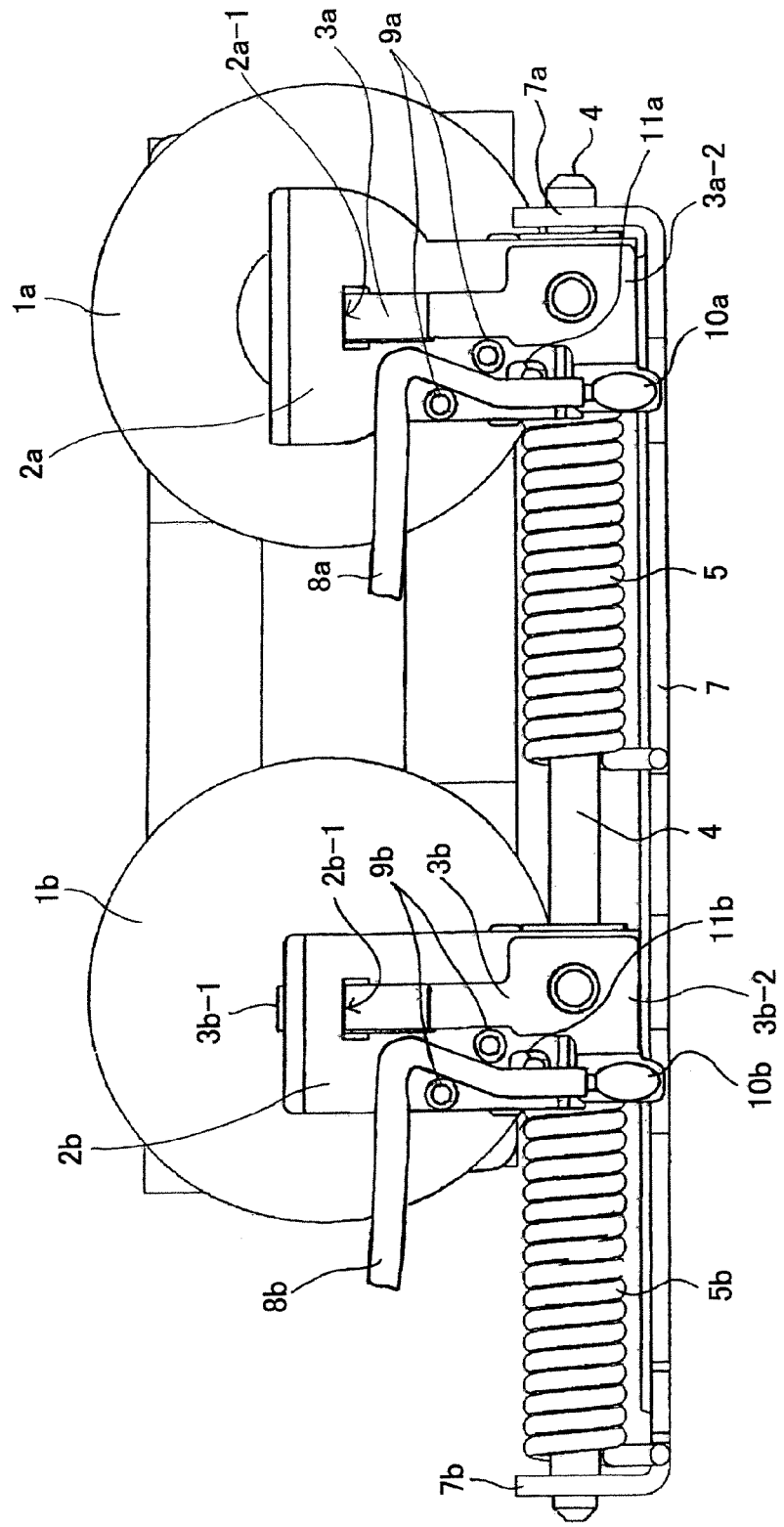
FIG. 5 is a right side surface view of the battery contact mechanism and the battery receiving structure of the embodiment shown in FIG. 3.
Figure 6:
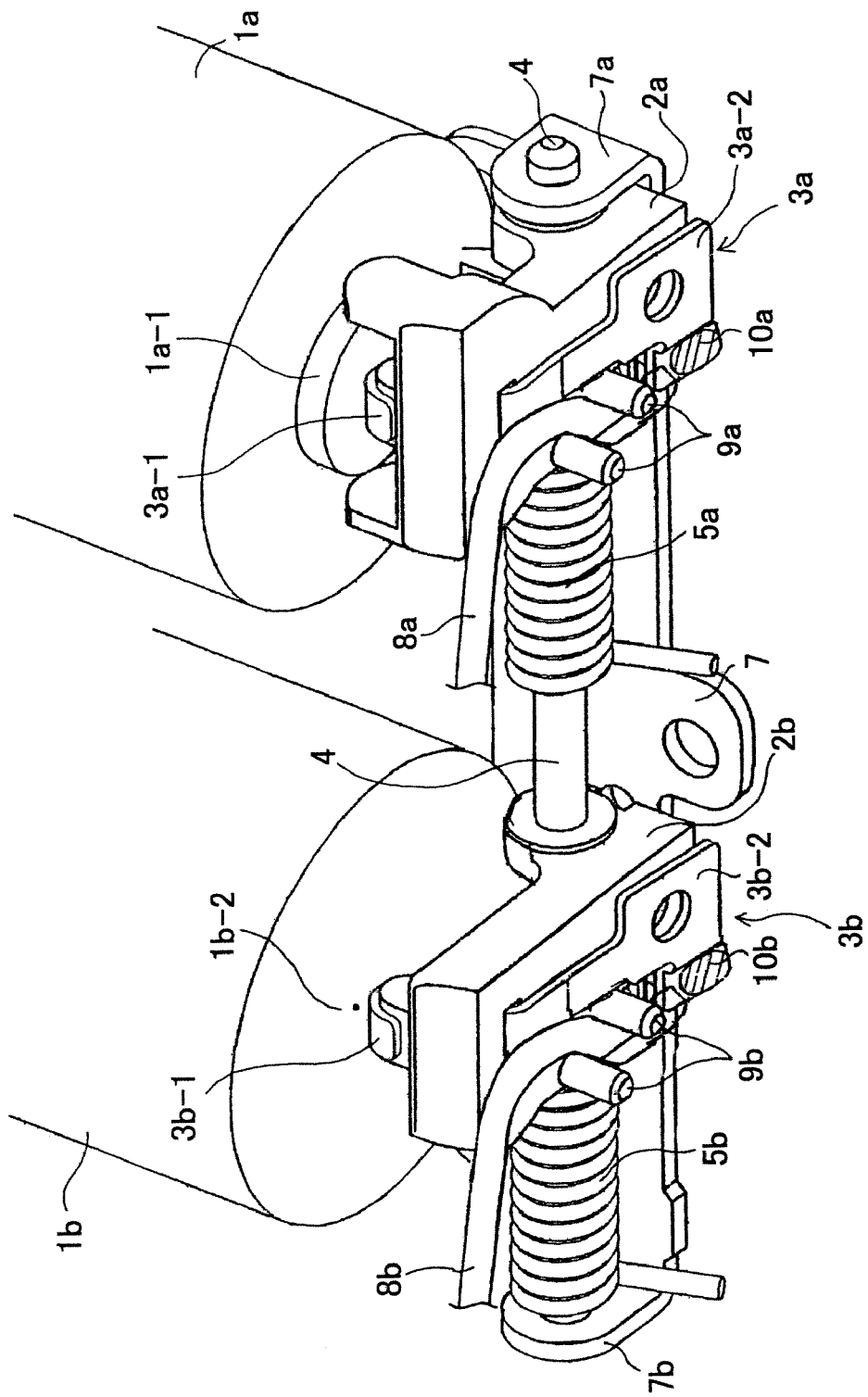
FIG. 6 is a perspective view of parts of the battery contact mechanism and the battery receiving structure of the embodiment shown in FIG. 3.
Figure 7:
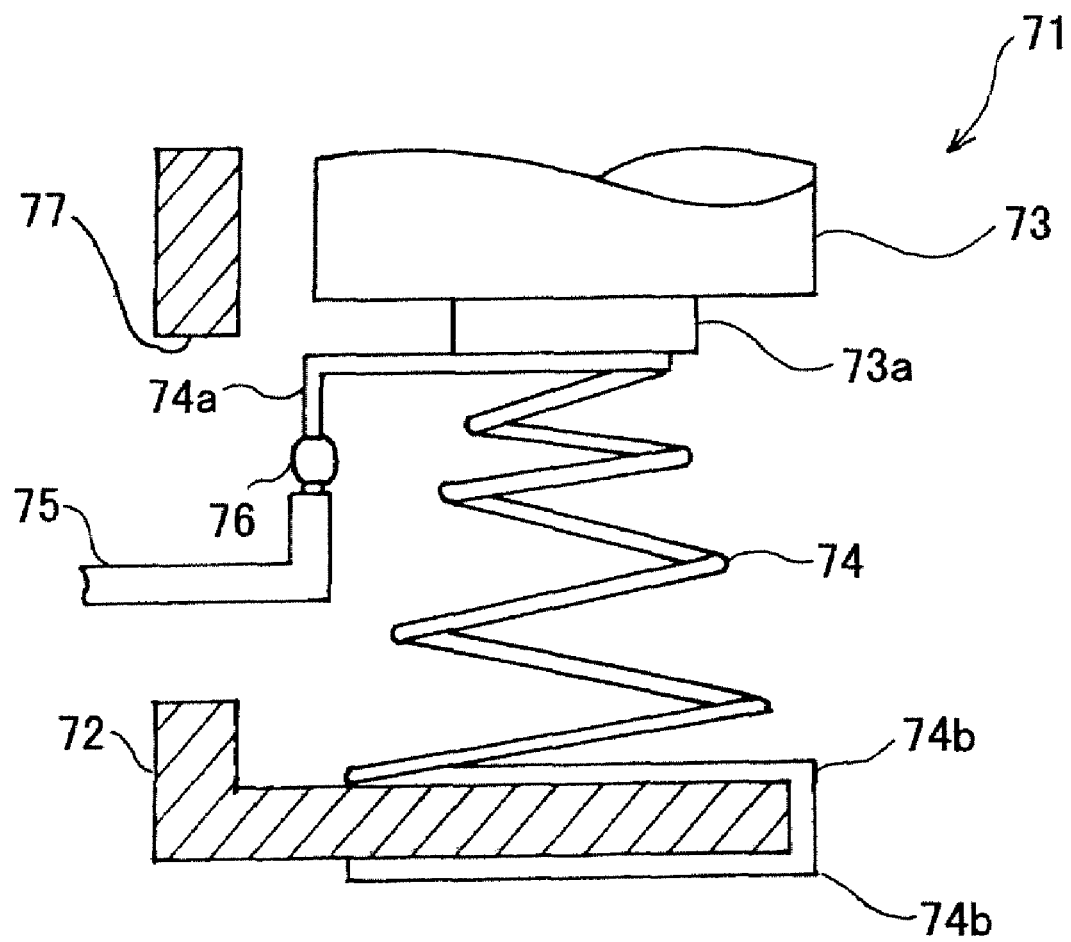
FIG. 7 is a partial front view showing of the battery receiving structure of the embodiment of the present invention.

FIG. 3 is a partial plan view of a battery contact mechanism and a battery receiving structure of an embodiment of the present invention and shows a state where a battery is received in a battery receiving room. FIG. 4 is a front view of the battery contact mechanism and the battery receiving structure of the embodiment shown in FIG. 3. FIG. 5 is a right side surface view of the battery contact mechanism and the battery receiving structure of the embodiment shown in FIG. 3. FIG. 6 is a perspective view of parts of the battery contact mechanism and the battery receiving structure of the embodiment shown in FIG. 3. FIG. 7 is a partial front view showing the battery receiving structure of the embodiment of the present invention.

The battery receiving structure includes a battery contact piece 20 provided in a battery receiving room (not shown) and the battery contact mechanism having a structure as discussed below. The battery contact piece 20 includes a common base 21, plate springs 22a and 22b provided on the common base 21, and converse contacts 6a and 6b. The battery contact mechanism works as a pressure-contacting mechanism using energizing forces by torsion coil springs (hereinafter "springs") 5a and 5b.

The battery contact mechanism includes a single shaft body (rotational shaft) 4 rotationally supported in the battery receiving room, the above-mentioned torsion coil springs 5a and 5b winding with respect to the shaft body 4 in a spiral state, levers 2a and 2b provided at the shaft body 4, and contact members 3a and 3b provided at the levers 2a and 2b and being capable of rotating unified with the levers 2a and 2b. The common base 21, the plate springs 22a and 22b, the converse contacts 6a and 6b, the contact members 3a and 3b having contacts 3a-1 and 3b-1 as head end parts, and the springs 5a and 5b are made of metal. However, it is preferable that the contact members 3a and 3b and converse contacts 6a and 6b be made of highly conductive metal material, namely copper, silver, gold, platinum, nickel, or an alloy including at lease one metal selected from a group consisting of copper, silver, gold, platinum, and nickel, so that battery electric power can be efficiently taken out. The levers 2a and 2b are made of insulator material, for example a hard plastic material.

Next, details of the structure of the battery contact mechanism are discussed with reference to FIG. 3. A fixed plate 7 is provided in the battery receiving room. Both end parts of the fixed plate 7 are bent so that bearing parts 7a and 7b are formed. The shaft body 4 is rotatably supported by the bearing parts 7a and 7b. The lever 2a with the contact member 3a having a substantially L-shaped configuration, the spring 5a, the lever 2b with the contact member 3b having a substantially L-shaped configuration, and the spring 5b are arranged in a shaft direction of the shaft body 4 at the shaft body 4 in this order. In this case, the springs 5a and 5b wind around and are fixed to the shaft body 4. One end part of each of the springs 5a and 5b is positioned in the vicinity of the fixed plate 7 and the other end parts of the spring 5a and 5b are inserted into long hole forming parts 11a and 11b formed in the levers 2a and 2b, respectively. Piercing hole forming parts 2a-1 and 2b-1 formed in the levers 2a and 2b are engaged with and fixed to the shaft body 4. Accordingly, the springs 5a and 5b make the contact members 3a and 3b tilt to an electrode side of the batteries 1a and 1b received in the battery receiving room, namely a side of a positive electrode 1a-1 of the battery 1a and a side of a negative electrode 1b-2 of the battery 1b, by the rotating force of the levers 2a and 2b based on energizing forces of the springs 5a and 5b, and thereby the contact members 3a and 3b make pressure contacted with the electrodes 1a-1 and 1b-2, respectively.

The contact members 3a and 3b extend from base end parts 3a-2 and 3b-2 situated in the vicinity of the shaft 4. The contact members 3a and 3b are inserted in the pierced hole forming parts 2a-1 and 2b-1 formed in the levers 2a and 2b. By the inserted part, the contact members 3a and 3b are fixed to the levers 2a and 2b. Extended parts of the contact members 3a and 3b work as contacts 3a-1 and 3b-1 against the electrodes of the batteries 1a and 1b. The base end parts 3a-2 and 3b-2 have tongue piece shaped configurations and have proper gaps against lower parts of the levers 2a and 2b, Under this structure, the base end parts 3a-2 and 3b-2 are used as operations pieces in a case where the battery is set in the battery receiving room. An operation for receiving the battery by the operations pieces is discussed below.

Furthermore, as shown in FIG. 5, sets of two projections (bosses) 9a and 9b are provided in the vicinities of the shaft body 4 of the levers 2a and 2b. Electric leads 8a and 8b are inserted in gaps between the sets of two projections 9a and 9b, respectively. First ends of the electric leads 8a and 8b are connected to the base end parts 3a-2 and 3b-2 of the contact members 3a and 3b by solder 10a and 10b, respectively. The other ends of the electric leads 8a and 8b are connected to a power substrate (not shown in FIG. 5)

Next, a battery contact mechanism having the above-discussed structure and an action of the electronic equipment such as a digital camera or cellular phone having the battery receiving structure are discussed.

The two batteries 1a and 1b are set in the battery receiving room in states shown in FIG. 3 through FIG. 6. In this case, base end parts 3a-2 and 3b-2 are simultaneously pressed by an operator's finger so that the springs 5a and 5b are rotated clockwise in FIG. 4, namely a direction opposite to the direction of energizing forces of the springs 5a and 5b, with the shaft body 4. At this time, the other end parts of the springs 5a and 5b move in the long hole forming parts 11a and 11b, namely in an upper direction in FIG. 5. Because of this, the gap between the contacts 3a-1 and 3b-1 of the contact members 3a and 3b and the converse contacts 6a and 6b is expanded. The batteries 1a and 1b are inserted between the contacts 3a-1 and 3b-1 and the converse contacts 6a and 6b in this state, and then the pressing forces to the base end parts 3a-2 and 3b-2 are turned off. Under this structure, the batteries 1a and 1b are tightly fixed in the battery receiving room by the energizing forces of the springs 5a and 5b. The contact 3a-1 of the contact member 3a securely comes in contact with the positive electrode 1a-1 of the battery 1a, the contact 3b-1 of the contact member 3b securely comes in contact with the positive electrode 1b-2 of the battery 1b, the converse contact 6a comes in contact with the negative electrode 1a-2 of the battery 1a, and the converse contact 6b comes in contact with the positive electrode 1b-1 of the battery 1b. As a result of this, electric power of the batteries 1a and 1b can be supplied to the power substrate (not shown in FIG. 5) via the electric leads 8a and 8b.

According to the above-discussed embodiment, the following advantages can be achieved.

(1) The instant disconnection problem of the electric power supply can be securely prevented and the battery electric power can be efficiently taken out. The battery electric power can be further efficiently taken out by making the contact member using a metal material having high conductivity.
(2) It is possible to prevent a state where electrodes of plural batteries are in a continuity state with each other by the levers 2a and 2b.
(3) Since the plural torsion coil springs wind around the single shaft body 4, the structure can be made simple, the installation span of the shaft body 4 can be long, and it is possible to stably rotate the shaft body 4.
(4) An excess force is not applied to the electric leads 8a and 8b when the shaft body 4 is rotated and the amount of displacement of the electric leads can be made minimum. Hence, it is possible to prevent an unstable state of the battery in the battery receiving room and generation of electrical leakage current from the electric leads 8a and 8b via the projections 9a and 9b.

Meanwhile, the applicant of the present invention developed a technology regarding the battery receiving structure whereby battery electric power can be stably taken out with low contact resistance, in order to solve the above-discussed problems of the related art battery receiving device.

As shown in FIG. 7, in this battery receiving structure, a circular cone-shaped coil spring 74 which has conductivity and energizes the battery 73 to one end side of the battery 73 situated in the battery receiving case 72 is fixed to the other end side of the battery 73. An electric lead 75 is connected by solder 76 to a bending end part 74a of the spring 74 formed at an end part at a side where a positive electrode 73a of the battery 73 comes in contact. The electric lead 75 is taken out to the outside of the battery receiving case 72 via a taking-out opening forming part 77. The taking-out opening forming part 77 has a configuration whereby the electric lead 75 can be moved freely when the spring 74 is deformed.

Under the above-discussed battery receiving structure, a battery contact is formed by the circular cone-shaped coil spring 74 and the electric lead 75 is soldered in the vicinity of a part where the spring 74 comes in contact with the battery electrode 73a. Because of this, the electric resistance is decreased and an electric voltage close to a primary electric voltage of a battery can be stably supplied to the driving part or the like of the electronic equipment. Furthermore, it is possible to prevent the generation of a bad connection caused by taking a load to the electric lead 75 or the like at the time when the battery 73 is taken in to or off from the battery receiving case 72.

Figure 1:
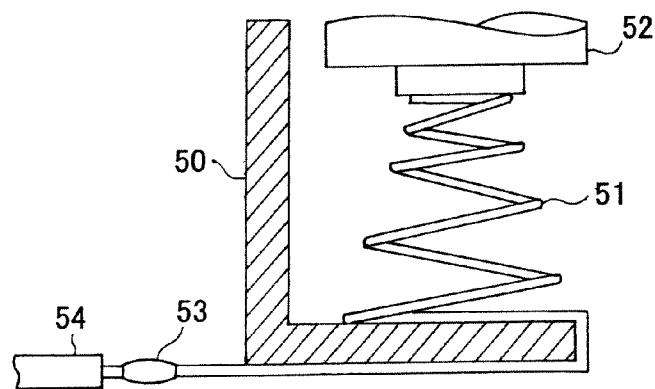
FIG. 1 is a partial front view showing a first example of the related art battery receiving structure.
Figure 2:
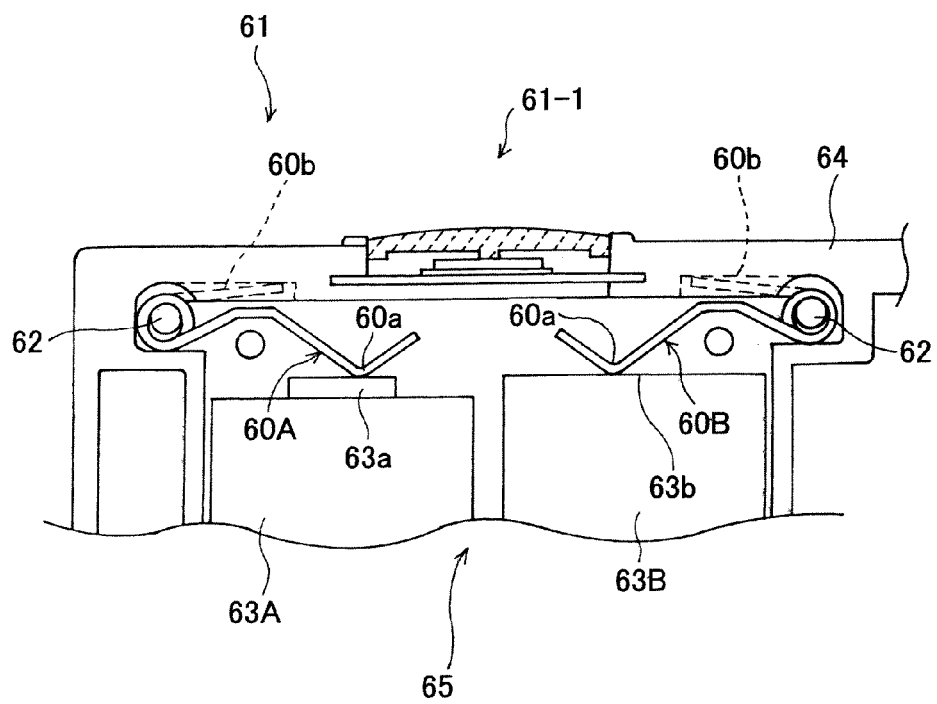
FIG. 2 is a partial front view showing a second example of the related art battery receiving structure.

However, in the battery receiving structure shown in FIG. 7, since the circular cone-shaped coil spring 74 works as the energizing member and contact member, this structure, as well as the structures of the battery receiving devices shown in FIG. 1 and FIG. 2, may have a disadvantage in that it is difficult to simultaneously satisfy a strong energizing force and high conductivity. In addition, under the contact structure with the circular cone-shaped coil spring, as well as the structure shown in FIG. 1, it may be difficult to securely prevent the instant disconnection problem.

On the other hand, according to the battery contact mechanism of the present invention, as described above, the instant disconnection problem of the electric power supply can be securely prevented and the battery electric power can be efficiently taken out.

The present invention is not limited to the above-discussed embodiments, but variations and modifications may be made without departing from the scope of the present invention.

This patent application is based on Japanese priority Patent Application No. 2004-59194 filed on Mar. 3, 2004, the entire contents of which are hereby incorporated by reference.

What is claimed is:

1. A battery contact mechanism to contact a battery including first and second electrodes, comprising:
 a fixed contact member configured to contact the first battery electrode;
 a rotatable contact member configured to contact the second battery electrode;
 a torsion coil spring configured to give a rotational force to the rotatable contact member to press the rotatable contact member in a direction so that the rotatable contact member is pressed against the second battery electrode, and thereby the first battery electrode contacts with the fixed contact member.

2. The battery contact mechanism as claimed in claim 1, further comprising:
 a shaft body;
 wherein the torsion coil spring is wound around the shaft body;
 wherein the rotatable contact member is formed adjacent the torsion coil spring at the shaft body; and
 wherein the rotatable contact member is provided separately from the torsion coil spring.

3. The battery contact mechanism as claimed in claim 1, wherein the rotatable contact member is made of a highly conductive metal material.

4. The battery contact mechanism as claimed in claim 2, further comprising:
 a lever made of insulating material and provided on the shaft body, the lever supporting the rotatable contact member and including a hole to receive an end of the torsion coil spring.

5. The battery contact mechanism as claimed in claim 4, further comprising:
 an electric lead supported on the lever and in contact with the rotatable contact member.

6. The battery contact mechanism as claimed in claim 4, wherein a plurality of the torsion coil springs are coaxially wound around the shaft body; and
 the same number of the levers as the number of the torsion coil springs are respectively provided in the vicinity of the torsion coil spring.

7. A battery contact mechanism to contact a battery including first and second electrodes, comprising:
 a fixed contact member configured to contact the first battery electrode;
 a rotatable contact member configured to contact the second battery electrode, wherein the rotatable contact member presses against the second battery electrode in a direction in which the first battery electrode contacts with the fixed contact member;
 a shaft body;
 a torsion coil spring wound around the shaft body; and
 a lever made of insulating material and provided on the shaft body, the lever supporting the rotatable contact member and including a hole to receive an end of the torsion coil spring;
 wherein the rotatable contact member is formed adjacent the torsion coil spring at the shaft body;

wherein a rotational force is given to the rotatable contact member by the torsion coil spring; and wherein the rotatable contact member is provided separately from the torsion coil spring.

8. The battery contact mechanism as claimed in claim 7, further comprising:

an electric lead supported on the lever and in contact with the rotatable contact member.

9. The battery contact mechanism as claimed in claim 7, wherein a plurality of the torsion coil springs are coaxially wound around the shaft body; and the same number of the levers as the number of the torsion coil springs are respectively provided in the vicinity of the torsion coil spring.

* * * * *